United States Patent [19]

Sakamoto et al.

[11] Patent Number: 5,364,684
[45] Date of Patent: Nov. 15, 1994

[54] MAGNETIC RECORDING MEDIUM COMPRISING A POLYETHYLENE-2,6-NAPHTHALATE MULTILAYERED FILM COATED ON BOTH SIDES BY A COATING LAYER

[75] Inventors: Seiji Sakamoto, Tokyo; Toshifumi Watanabe, Nagahama; Toshifumi Takisawa, Kawasaki, all of Japan

[73] Assignee: Diafoil Hoechst Company, Limited, Tokyo, Japan

[21] Appl. No.: 909,400

[22] Filed: Jul. 6, 1992

[30] Foreign Application Priority Data

Jul. 10, 1991 [JP] Japan .................. 3-170198

[51] Int. Cl.$^5$ .................. G11B 05/00
[52] U.S. Cl. .................. 428/141; 428/212; 428/213; 428/216; 428/323; 428/327; 428/328; 428/329; 428/330; 428/331; 428/336; 428/413; 428/425.9; 428/480; 428/481; 428/483; 428/522; 428/523; 428/532; 428/694 TS; 428/694 TB; 428/694 SL; 428/694 SG
[58] Field of Search ............... 428/480, 694, 900, 141, 428/336, 402, 212, 695, 483, 213, 216, 323, 327, 328, 329, 330, 331, 413, 425.9, 481, 522, 523, 532, 694 TB, 694 SL, 694 SG

[56] References Cited

U.S. PATENT DOCUMENTS

| | | | |
|---|---|---|---|
| 4,267,657 | 8/1988 | Sakamoto et al. | 428/143 |
| 4,489,117 | 12/1984 | Ono et al. | 428/147 |
| 4,504,542 | 3/1985 | Miyoshi et al. | 428/336 |
| 4,550,049 | 10/1985 | Ono et al. | 428/141 |
| 4,568,599 | 2/1986 | Ono et al. | 428/141 |
| 4,780,366 | 10/1988 | Nishimatsu et al. | 428/323 |
| 4,803,125 | 2/1989 | Takeuchi et al. | 428/411.1 |
| 5,051,292 | 9/1991 | Katoh et al. | 428/141 |
| 5,069,962 | 12/1991 | Okazaki et al. | 428/323 |
| 5,200,255 | 4/1993 | Matsubara et al. | 428/212 |

FOREIGN PATENT DOCUMENTS

| | | |
|---|---|---|
| 0158961 | 10/1985 | European Pat. Off. . |
| 0226162 | 6/1987 | European Pat. Off. . |
| 55-15770 | 4/1980 | Japan . |
| 55-47050 | 11/1980 | Japan . |
| 60-50150 | 11/1985 | Japan . |
| 63-28097 | 6/1988 | Japan . |
| 1-26337 | 5/1989 | Japan . |
| 1-26338 | 5/1989 | Japan . |

Primary Examiner—Stevan A. Resan
Attorney, Agent, or Firm—Foley & Lardner

[57] ABSTRACT

Disclosed herein is a magnetic recording medium comprising:

a stretched polyethylene-2,6-naphthalate multilayered film having a high-roughness surface and a low-roughness surface;

a coating layer (A) having specific surface properties and being formed on the high-roughness surface of said multilayered film;

a coating layer (B) having a specific surface property and being formed on the low-roughness surface of said multilayered film; and a thin ferromagnetic metal film formed on said coating layer (B).

13 Claims, No Drawings

MAGNETIC RECORDING MEDIUM COMPRISING A POLYETHYLENE-2,6-NAPHTHALATE MULTILAYERED FILM COATED ON BOTH SIDES BY A COATING LAYER

BACKGROUND OF THE INVENTION

The present invention relates to a magnetic recording medium having a ferromagnetic metal layer as a magnetic recording layer disposed on a stretched polyethylene-2,6-naphthalene multilayered film. More particularly the present invention relates to the magnetic recording medium which is high in output, and excellent in output stability and running property.

Further improvement of magnetic recording density strongly required in the art, and recently a non-binder-type magnetic recording medium has become into the spotlight in place of the conventional coating type magnetic recording medium in which the magnetic material is dispersed in an organic binder and coated and dried, or a magnetic recording medium in which the binder in the dispersion is cross-linked by electron radiation. This new magnetic recording medium is characterized by forming a thin film of a ferromagnetic metal on the surface of a non-magnetic support such as polyester film or polyimide film by a suitable method such as vacuum deposition method, sputtering method, ion plating method, electroplating method, electroless plating method, etc. As is well known, for the increase of recording density, it is an essential requirement to make the magnetic layer as thin as possible in view of the thickness loss. In the non-binder-type magnetic recording medium, it is required that the thickness of the magnetic layer is usually not more than 1 $\mu$m, preferably not more than 0.5 $\mu$m.

As the thickness of the magnetic layer is reduced, the unevenness of the support surface becomes more liable to affect to the surface of the magnetic layer, resulting in noticeably affecting the performances of video film and audio films, for example, electromagnetic properties such as output, output variation, output defect, etc. of the video films or audio films as compared with the conventional magnetic recording media.

Therefore, in the development of magnetic recording media having such a ferromagnetic metal layer, smoothness of the support is required more than ever.

However, as the film surface is smooth, the slippery property of the film reduces, resulting in deteriorating its handling property and running property. If the running surface of a magnetic recording medium, that is, the film surface on the side opposite from the ferromagnetic metal layer is smooth, running of the tape becomes unstable and, in an extreme case, the tape becomes unable to run.

For a magnetic recording medium provided with a ferromagnetic metal layer satisfying both requirements for smoothness and slipperiness, there are proposed to dispose a coating layer on the base film (Japanese Patent Publication (Kokoku) Nos. 55-47050, 60-50150, 63-28097, or to use a base film wherein the roughness of both sides thereof is different each other (Japanese Patent Publication (Kokoku) No. 55-15770). It was also proposed to use these techniques in combination (Japanese Patent Publication (Kokoku) Nos. 1-26337, 1-26338).

Employment of these known techniques is still insufficient to well meet the recent strict requirements for the magnetic recording media. Further, when a magnetic recording medium is wound up, there often takes place backside transfer phenomenon that roughness on the opposite side transfers to the surface of the magnetic layer, whereby it is difficult to attain desired high quality.

Polyethylene terephthalate film has been popularly used as base film for magnetic recording media, but the polyethylene-2,6-naphthalate film (hereinafter referred to as PEN film) with which it is relatively easy to attain increase of recording density, is more suited as base film for the magnetic recording media having a ferromagnetic metal layer, of which further reduction of thickness is required. However, the adhesion between such PEN film and the ferromagnetic metal layer formed by vacuum deposition method, is not always satisfactory.

As a result of earnest studies for overcoming the said prior art problems, it has been found that by forming a coating layer (A) having characteristics defined by the following formulae (1)–(3) concerning a three-dimensional average protuberance height "Ha" (unit: $\mu$m), the number of the protuberances "Na" (unit: protuberances/mm$^2$) and its hardness "HD" (unit $\mu$m$^{-2}$) in its surface, on the high-roughness surface of a stretched polyethylene-2,6-naphthalate multilayered film, then forming a coating layer (B) having specificities defined by the following formula (4) concerning a three-dimensional average protuberance height "Hb" (unit: $\mu$m) in its surface on the low-roughness surface of the said multilayered film and further forming a thin ferromagnetic metal film on the said coating layer (B), the obtained magnetic recording medium has substantially no scratches on its ferromagnetic metal film surface by protuberances of the multilayered film, shows a stabilized running property, is capable of maintaining the VTR head output almost unchanged from its initial level after 100 times of repeated runs, and thus is high in output and excellent in output stability.

$$0.01 \leq Ha \leq 0.08 \tag{1}$$

$$10{,}000 \leq Na \leq 60{,}000 \tag{2}$$

$$10 \leq HD \leq 150 \tag{3}$$

$$0.001 \leq Hb \leq 0.008 \tag{4}$$

The present invention was achieved on the basis of this finding.

SUMMARY OF THE INVENTION

In an aspect of the present invention, there is provided a magnetic recording medium comprising a stretched polyethylene-2,6-naphthalate multilayered film having a high-roughness surface and a low-roughness surface, a coating layer (A) having surface characteristics represented by the following formulae (1)–(3) and being formed on the high-roughness surface of the multilayered film, a coating layer (B) having surface characteristic represented by the following formula (4) and being formed on the low-roughness surface of the multilayered film, and a thin ferromagnetic metal film formed on the coating layer (B).

$$0.01 \leq Ha \leq 0.08 \tag{1}$$

$$10{,}000 \leq Na \leq 60{,}000 \tag{2}$$

$$10 \leq HD \leq 150 \tag{3}$$

$$0.001 \leq Hb \leq 0.008 \quad (4)$$

[wherein Ha represents a three-dimensional average protuberance height (unit: $\mu m$) in the surface of the coating layer (A), Na represents the number of the protuberances (unit: protuberances/$mm^2$) in the surface of the coating layer (A), HD represents a surface hardness (unit: $\mu m^{-2}$) of the coating layer (A) and Hb represents a three-dimensional average protuberance height (unit: $\mu m$) in the surface of the coating layer (B)]

DETAILED DESCRIPTION OF THE INVENTION

The magnetic recording medium according to the present invention is a five-layered medium composed of a ferromagnetic metal layer, a coating layer (B), a first PEN film having a low-roughness surface, a second PEN film having a high-roughness surface and a coating layer (A). Of course, other layer(s) such as a lubricant layer, an antioxidant layer, etc., may be disposed on the surface of the ferromagnetic metal layer, if necessary. Also, a third PEN film may be disposed between the said two PEN films as far as the purpose of the present invention is not impaired.

PEN in the present invention is a polyester composed of 2,6-naphthalenedicarboxylic acid as main component (for example, 80 mol. % or more) of acid moiety and ethylene glycol as main component (for example, 80 mol. % or more) of glycol moiety. Such polyester may contain other component(s) as far as the purpose of the present invention is not impaired. As other component(s), there can be used, for instance, one or more of the bifunctional acids such as terephthalic acid, isophthalic acid, adipic acid, sebacic acid and p-hydroxybenzoic acid, and one or more of the glycol compounds such as trimethylene glycol, 1,4-hexamethylene glycol and cyclohexanedimethanol.

In the present invention, in order to make the film of a surface roughness different between the obverse and reverse, fine particles or a different kind of polymer may be contained in the said polymer.

The PEN film according to the present invention is a multilayered film formed by coextrusion method and stretched. PEN's having the different compositions are melted and joined in a slot die or before the slot die to form a laminate structure, and after coextrusion, the resultant laminate is stretched and heat-set in the usual ways. By this process, there can be obtained a multilayered film having good adhesion between layers. In the present invention, it is essential that PENs be laminated with each other and the resultant laminate be stretched. In the case of, for example, a PET and PEN multilayered film, such film is disadvantageous in respects of thickness uniformity and heat shrinkage, because of the different optimal film-forming conditions for the respective layers. Such film is also unsatisfactory in strength.

In the present invention, the thickness of the PEN multilayered film after stretching is usually 3 to 20 $\mu m$, preferably 4 to 15 $\mu m$. In the case of the two-layered film, the ratio of thickness of the low-roughness layer to that of the high-roughness layer is about 1:5 to 10:1.

A typical method for forming the PEN multilayered film according to the present invention is as follows. A molten laminate is melt-extruded into the form of a film at a temperature of 275° to 320° C. and then cooled and solidified at a temperature of 40° to 90° C. to form an amorphous sheet, and the resultant sheet is stretched in the machine and transverse directions successively or simultaneously and then heat-treated at a temperature of 160° to 240° C. In the above process, the stretching may be performed in multiple stages or so-called re-stretching may be performed.

For obtaining a film having a high roughness surface, it is recommended to contain an appropriate amount of fine inactive particles in PEN. As such inactive particles, there can be used, for instance, the insoluble catalyst residue precipitated in the reaction system in the course of polyester forming reaction; inorganic particles such as kaolin, silica, calcium carbonate, titanium oxide, aluminum oxide, carbon black, etc.; and cross-linked polymer particles having excellent heat resistance. These particles are usually the ones having an average particle size in the range of 0.01 to 0.3 $\mu m$, preferably 0.05 to 0.2 $\mu m$, and the amount of the particles blended is 0.01 to 5% by weight, preferably 0.05 to 3% by weight. Also, there may be employed a method in which other thermoplastic resin such as polyethylene glycol, polyphenylene sulfide, liquid crystal polymer or the like is blended and finely dispersed. It is also possible to conduct other method such as corona discharge treatment, ultraviolet irradiation, solvent treatment, etc.

In any case, in the present invention, in view of film handling property before the coating step in the film-forming process including the wind-up operation, a center line average roughness (Ra) of the film on the high-roughness surface is usually in the range of 0.001 to 0.010 $\mu m$, preferably 0.004 to 0.008 $\mu m$.

In the present invention, for imparting an even higher running property to the magnetic recording medium, a coating layer (A) containing a lubricant is disposed on the high-roughness surface thereof. This coating layer (A) can be formed usually by applying a dispersion of a lubricant in water or a solvent together with a binder on the film surface. As the coating method, known methods can be used. For example, there can be used a method in which an aqueous or solvent solution containing a polymeric binder, a lubricant and if necessary a surface active agent is applied on a non-stretched or monoaxially stretched polyester film and then biaxially stretched, or a method in which the said solution is applied on a biaxially stretched polyester film.

As lubricant to be contained in the coating layer, there can be favorably used the inorganic lubricants such as silicon oxide, aluminum oxide, kaolin, molybdenum sulfide, titanium oxide, calcium carbonate, etc., or the organic lubricants such as fluorics resin, polyethylene, polypropylene, polystyrene, polymethyl methacrylate, cross-linked polymers, etc.

The lubricant used in the present invention is usually of an average particle size in the range of 0.01 to 0.5 $\mu m$, and its concentration in the coating agent is 0.5 to 40% by weight, preferably 1 to 15% by weight.

Examples of the polymeric binders usable in forming the said coating layer (A) are polyesters, urethanes resin, olefins resin, celluloses resin, phenols resin, epoxys resin, vinyl-acetates resin and rubbers resin such as SBR. The concentration of the polymeric binder in the coating agent is 60 to 99.5% by weight, preferably 90 to 99% by weight.

The coating layer (A) thus obtained is essentially composed of 60 to 99.5% by weight, preferably 90 to 99% by weight of a polymeric binder and 0.5 to 40% by weight, preferably 1 to 10% by weight of a lubricant.

In the present invention, as described above, a coating layer (A) is formed on a polyester film for improving the running property of the film. Said coating layer may be provided with a priming layer for improving adhesiveness, or it may be composed of a multilayer structure for increasing roughness stepwise.

The surface roughness which serves as an index for slipperiness has often been expressed by "Ra". The present inventors have found that in a magnetic recording medium which is required to have little possibility of causing the back-side transfer phenomenon in addition to good slipperiness, it is possible to grasp the relation between surface roughness and performance of magnetic recording medium more accurately, by defining and indicating separately the height and the number of the protuberances; and have found that when the recording medium is wound up, the hardness of a coating layer contacting with the magnetic layer surface needs to be in a specified range.

Thus, in the present invention, it is necessary that the surface of the coating layer (A) satisfies the following formulae (1)–(3) at the same time:

$$0.01 \leq Ha \leq 0.08 \qquad (1)$$

$$10,000 \leq Na \leq 60,000 \qquad (2)$$

$$10 \leq HD \leq 150 \qquad (3)$$

The preferred ranges of the above parameters are as follows:

$$0.02 \leq Ha \leq 0.05 \qquad (1')$$

$$14,000 \leq Na \leq 50,000 \qquad (2')$$

$$20 \leq HD \leq 70 \qquad (3')$$

[in the above formulae, Ha represents a three-dimensional average protuberance height (unit: μm) in the surface of the coating layer (A), Na represents the number of the protuberances (unit: protuberances/mm$^2$) in the surface of the coating layer (A), and HD represents a surface hardness (unit: μm$^{-2}$) of the coating layer (A)].

When "Ha" and "Na" are below the ranges defined in (1) and (2) above, the running property of the tape becomes unstable and/or the output variation is enlarged. On the other hand, when "Ha" and "Na" exceed the defined ranges, the back-side transfer phenomenon of the surface state of the coating layer (A) to the surface of the magnetic layer becomes remarkable, and the electromagnetic properties of the tape are deteriorated.

Also, when "HD" is less than 10, the running property of the tape are deteriorated and the output variation is enlarged, and when "HD" exceeds 150, the abovesaid back-side transfer phenomenon occurs frequently.

Thus, in the present invention, it is essential that a large number of relatively uniform protuberances be formed in the film surface, and that the hardness of the film surface be arranged to a specified range. For this, a control of roughness of the PEN film as base film, a selection of the compound used for forming the protuberances in the coating layer, the binder and the drying conditions, are the important factors, and the object of the present invention is attained by properly combining these factors.

The thickness of the coating layer (A) is usually in the range of 0.02 to 2 μm.

The layer forming the low-roughness surface of the PEN multilayered film according to the present invention is usually substantially free of inactive material, but, if necessary, the said layer may be treated so that "Ra" thereof will be less than 0.004 μm, preferably in the range of 0.001 to 0.004 μm, by employing the same methods as used for providing a high roughness. The definition of "substantially free of inactive material" used here means that the content of inactive material is not more than 0.05% by weight.

In the present invention, another coating layer (B) is further disposed on the low-roughness surface of the said PEN film.

The coating layer (B) is provided for elevating adhesiveness of the deposited metal without impairing smoothness of the non-magnetic support. This layer can be formed by using a coating solution prepared by dissolving or finely dispersing the same polymeric compound as used for the coating layer (A) in water or a solvent. This object can be achieved more effectively by using a polymeric compound having a lower glass transition temperature than that of the base polyester film. It is preferable that the coating layer (B) is substantially free of lubricant for making a rough surface, and it is rather preferred that the surface roughness of the coating layer (B) becomes lower than that of the polyester film. This can be achieved easily by using the said polymeric compound. A three-dimensional average protuberance height "Hb" in the surface of the coating layer (B) is 0.001 to 0,008 μm, preferably 0.001 to 0.005 μm. The definition of "substantially free of lubricant" used here means that the content of lubricant is not more than 0.05% by weight.

The thickness of the coating layer (B) is usually in the range of 0.01 to 1 μm, preferably 0.02 to 0.5 μm. When this thickness is below the said range, it is difficult to achieve the intended improvement of adhesive strength, ant it is also difficult to make the surface roughness of the coating layer (B) lower than that of the polyester film. When the said thickness exceeds 1 μm, the mechanical strength and heat-resistance properties of the non-magnetic support become to be deteriorated.

The coating layer (B) may be formed by laminating a plurality of layers as far as the purpose thereof is fulfilled.

In the present invention, a ferromagnetic metal film is formed on the surface of the coating layer (B). More specifically, a thin film of iron, cobalt, nickel, chromium, oxide thereof or an alloy mainly composed of any of the said metals is formed to a thickness of usually 0.02 to 1 μm by an appropriate method such as vacuum deposition method, sputtering method, ion plating method, etc.

In the present invention, in order to attain both improvement of characteristics such as a heat touch property, etc. of the magnetic recording medium and reduction of film thickness at the same time, the Young's modulus of the multilayered PEN film is set to be usually not less than 650 kg/mm$^2$, preferably not less than 700 kg/mm$^2$, more preferably not less than 750 kg/mm$^2$, most preferably not less than 780 kg/mm$^2$ in both machine and transverse directions.

It is preferable that each layer has a crystallinity of 28 to 38%. When the crystallinity of any layer is less than 28%, there may take place excessive film shrinkage, and when the said crystallinity exceeds 38%, an abrasion resistance of the film become to be deteriorated and white powder tends to be produced when the film contacts with the base equipments.

The magnetic recording medium according to the present invention is substantially free of scratches on the surface of the thin ferromagnetic metal film, shows a stable running characteristics and an almost unchanged VTR head output after 100 times of repeated runs from the initial value (further the VTR head output is not less than +1.0 both at the start of and after 100 times of repeated runs).

Thus, the magnetic recording medium of the present invention is of high output and excellent in output stability and running property, so that its industrial value is high.

EXAMPLES

The following examples further illustrate the present invention. It is to be understood, however, that these examples are merely intended to be illustrative and not to be construed as limiting the scope of the invention.

The determination methods used in the present invention are described below.

(1) Surface Roughness (Ra)

A center line average roughness Ra ($\mu$m) was expressed as surface roughness. It was determined in the following way by using a surface roughness tester SE-3F (mfd. by Kosaka Kenkyusho Inc.). From each sample film, a portion of the reference length L (2.5 mm) was cut out in the direction of the center line from the sectional curve of the film. In the coordinates with X-axis representing the center line of the cut out portion and Y-axis representing the direction of longitudinal magnification, and with the roughness curve expressed by y=f(x), the value ($\mu$m) given from the following formula was expressed as surface roughness. A center line average roughness was determined by finding 10 sectional curves from the sample film surface and calculating the average value of center line average roughnesses of the cut-out portion determined from the said sectional curves. The radius at the tip of the stylus was 2 $\mu$m, the load applied thereto was 30 mg and cutoff was 0.08 mm.

$$Ra = \frac{1}{L} \int_0^L |f(x)| dx$$

(2) Three-Dimensional Average Protuberance Height and Number of the Protuberances These were measured by using a three-dimensional surface roughness tester SE-3AK (mfd. by Kosaka Kenkyusho Inc.) under the following conditions: tip radius of stylus: 5 $\mu$m, needle pressure: 30 mg, stylus scanning speed: 0.1 mm/sec, measuring length: 0.5 mm, sampling pitch: 1.0 $\mu$m, and cutoff: 0.25 mm. Protuberance height and the number of the protuberances were measured by setting the magnification in the direction vertical to the film surface at 50,000 times and 20,000 times (either of these magnifications was selected according to roughness of the surface to be measured; X50,000 magnification was applied in the case where the three-dimensional average protuberance height was not more than 0.01 $\mu$m and X20,000 magnification in the case where the three-dimensional average protuberance height was more than 0.01 $\mu$m), setting the magnification in the direction parallel to the film surface at 200 times and conducting scanning along 500 lines. Pertaining to the relation between protuberance height and number of the protuberances, the protuberance height at which the number of the protuberances became the largest, was regarded as 0 level, and the number of the protuberances at the 0 level was expressed as "n". Also, the protuberance height from the 0 level was expressed as "Hi" (height of the ith protuberance), and the three-dimensional average protuberance height "H" was determined from the following formula:

$$H = \frac{\sum_{i=1}^{n} Hi}{n}$$

(3) Hardness of Coating Film

Measured by using a dynamic ultra-microhardness tester DUH-50 (mfd. by Shimadzu Corp.). The coating film was dried at 80° C. for 5 hours and solidified on a slide glass and its Vickers hardness was measured by applying a load of 0.1 g to a penetrator with vertically opposite angles of 115°. The HD was calculated from the following formula:

$$HD = 3.7838/h^2$$

(wherein h represents the depth of penetration ($\mu$m) of the penetrator when a load of 0.1 g was applied thereto).

Measurements were made under the conditions of 23° C. and 50% RH.

(4) Young's Modulus

A 300 mm long and 20 mm wide sample film was pulled at a straining rate of 10%/min in a chamber controlled to 23° C. and 50% RH, by using a tensile tester INTESCO MODEL 2001 (mfd. by Intesco Co., Ltd.), and Young's modulus was calculated from the following formula by using the initial rectilinear section of the tensile stress-strain curve.

$$E = \Delta\sigma/\Delta\epsilon$$

(wherein E represents Young's modulus (kg/mm$^2$); $\Delta\sigma$ represents a difference in stress due to the original average sectional area between the two points on the straight line; and $\Delta\epsilon$ represents a difference in strain between said two points).

(5) Scratching to film surface

Aluminum was deposited on the film surface and the degree of scratching was observed by a microscope (X50 magnification) and ranked as follows.

A: There was substantially no scratch on the film surface, and no problem arose with deposition of a ferromagnetic metal.

B: There were seen shallow scratches of several to several ten $\mu$m in length, and such scratches could cause drop out.

C: The degree of scratching was severe, and drop out was often induced.

(6) Production of Magnetic Tapes and Property Evaluation

A thin ferromagnetic film (about 0.1 $\mu$m in thickness) of an alloy composed of 80 wt. % of cobalt and 20 wt. % of nickel was formed by vacuum deposition method, and the film was slit into a ½ inch in width to make a video tape. This video tape was wound up by a length of 5,000 meters on a 6 inch-diameter core.

Then this magnetic tape was subjected to evaluation of the following items by using a commercially available video tape recorder.

(i) VTR-Head Output

The VTR-head output at the measuring frequency of 4 MHz was measured by using a synchroscope. The blank was supposed to be 0 decibel and the relative value of the test tape was indicated by decibel. Although this value is the initial value, the same measurement was made after 100 times of repetitive runs. The value given by this measurement has a strong interrelation with adhesive strength of the magnetic layer, and as the initial value, the higher the value, the better.

(ii) Running Property of the Magnetic Tape and Its Output Variation

The running property of the magnetic tape was judged by the range of variation of VTR-head output and the degree of running tension, and ranked as follows.

A: There was almost no variation of VTR-head output, the running tension was low and the running of the tape was stable.

B: The running of the tape was stable, but there was seen some variation of head output.

C: The range of variation of head output was wide, variation of running tension was also observed, and the running state of the tape was very unstable.

EXAMPLE 1

Preparation of PEN

An ester exchange reaction was carried out by using 100 parts by weight of dimethyl 2,6-naphthalenedicarboxylate, 55 parts by weight of ethylene glycol and 0.09 parts by weight of magnesium acetate tetrahydrate. Then 0.04 parts by weight of ethyl acid phosphate, 0.4 parts by weight of silicon oxide having an average particle size of 0.02 $\mu$m and 0.035 parts by weight of antimony trioxide were added to the reaction mixture, and the polycondensation reaction was carried out according to a conventional method to obtain polyethylene-2,6-naphthalate having an intrinsic viscosity of 0.50.

This polymer was then subjected to solid-phase polymerization in a nitrogen stream at 240° C. for 7 hours to obtain PEN (A) having an intrinsic viscosity of 0.63.

There was also obtained PEN (B) having an intrinsic viscosity of 0.64 by following the same procedure as the preparation of PEN (A) except that the amount of silicon oxide was changed to 0.05 parts.

Production of PEN Laminate Film

PEN (A) and PEN (B) were melted at 290° C. in the separate extractors, then joined in a passageway, extruded into the form of a sheet from the slot die and quickly cooled by using an electrostatic cooling method to obtain an amorphous sheet having 130 $\mu$m in thickness. This amorphous sheet was passed between the rolls so that the PEN (A) layer of the sheet would contact with the roll surface, and stretched 5.4 times in the machine direction at 135° C. by making use of the difference in peripheral speed between the rolls. It was then further stretched 5.0 times in the transverse direction at 137° C. and heat-treated at 230° C. to obtain a biaxially oriented PEN multilayered film having 5.0 $\mu$m in thickness. The thickness of the PEN (A) layer and the PEN (B) layer in the obtained multilayered film was 1.0 $\mu$m and 4.0 $\mu$m, respectively. The "Ra" of their exposed surfaces was 0.004 $\mu$m and 0.001 $\mu$m, respectively. The Young's modulus of the obtained multilayered film was 750 kg/mm$^2$ in the machine direction and 750 kg/mm$^2$ in the transverse direction. The film had no scratches due to contact with the rolls and could be smoothly wound up. Crystallinity was 35% for both layers.

Formation of Coating Layers

A solution prepared by dissolving or dispersing 65 parts by weight of acrylic resin, 20 parts by weight of polyester, 10 parts by weight of sodium acrylate and 5 pares by weight of silicon oxide having an average particle size of 0.1 $\mu$m in 3,300 parts by weight of water was applied on the surface of the PEN (A) layer of the said film, and the film was passed through a drying oven to form a coating layer (A) having a thickness of 0.10 $\mu$m. The "Ha" of the surface of the coating layer (A) was 0.04 $\mu$m, the "Na" was 19,500 and the "HD" was 20.

Then, a solution prepared by dissolving 75 parts by weight of acrylic resin and 25 parts by weight of polyester resin in 4,900 parts by weight of water was applied on the surface of the PEN (B) layer of the said film and dried to form a coating layer (B) having a thickness of 0.03 $\mu$m. The "Hb" of the surface of the coating layer (B) was 0.002.

Formation of Magnetic Film

A thin ferromagnetic metal film was formed on the surface of the coating layer (B) to obtain a magnetic recording medium and its performance was evaluated. It was excellent in image quality and running property and had high practical value.

EXAMPLE 2

A magnetic tape was produced by following the same procedure as Example 1 except that the particles contained in the PEN (A) layer were changed to 0.3 parts by weight of aluminum oxide having an average particle size of 0.03 $\mu$m and that the thickness of the said layer after stretching was made 1.5 $\mu$m, and the performance of the obtained magnetic tape was evaluated.

EXAMPLE 3

A magnetic tape was produced by following the same process as Example 1 except for using 10 parts by weight of sodium acrylate in the composition of the coating layer (A) instead of 10 parts by weight of alkylolmelamine, and the obtained magnetic tape was evaluated.

COMPARATIVE EXAMPLE 1

By conducting the same process as the preparation of PEN (A) in Example 1 except for using no silicon oxide, there was obtained PEN (C) containing substantially no particles.

Then a magnetic tape was obtained by following the same procedure as Example 1 except for using PEN (C) instead of PEN (A) and changing the amount of the silicon oxide particles in the coating layer (A) to 1.5 parts by weight, and the obtained magnetic tape was evaluated in the same way as Example 1.

COMPARATIVE EXAMPLE 2

A magnetic tape was obtained according to the same process as Example 1 except for changing the particles contained in the coating layer (A) to 6 parts by weight of calcium carbonate having an average particle size of 0.6 $\mu$m.

COMPARATIVE EXAMPLE 3

A magnetic tape was obtained by following the same procedure as Example 1 except that the composition of the coating layer (A) was composed of 95 parts by weight of polyester (40 parts by weight of terephthalic acid, 45 parts by weight of isophthalic acid and 15 parts by weight of isophthalic acid-5-sodium sulfonate as acid moiety, and 45 parts by weight of ethylene glycol and 55 parts by weight of diethylene glycol as glycol moiety) and 5 parts by weight of silicon oxide having an average particle size of 0.1 μm.

COMPARATIVE EXAMPLE 4

A magnetic tape was obtained by following the same procedure as Example 1 except that the composition of the coating layer (A) was composed of 60 parts by weight of polyester (92 parts by weight of terephthalic acid and 8 parts by weight of isophthalic acid-5-sodium sulfonate as acid moiety, and 95 parts by weight of ethylene glycol and 5 parts by weight of diethylene glycol as glycol moiety), 25 parts by weight of polysiloxane, 12 parts by weight of alkylolmelamine and 3 parts by weight of silicon oxide having an average particle size of 0.4 μm.

COMPARATIVE EXAMPLE 5

A magnetic tape was made by following the same procedure as Example 1 except that no coating layer (B) was disposed, and that a magnetic metal was directly deposited on the PEN (B) layer.

The results obtained in the above-described Examples and Comparative Examples are shown in Table 1.

TABLE 1

| | Coating layer (A) | | | Coating layer (B) | Degree of scratching to film surface | Properties of magnetic tape | | |
|---|---|---|---|---|---|---|---|---|
| | | | | | | Running performance | Head output | |
| | | | | | | | Initial | After 100 runs |
| | Ha | Na | HD | Hb | | | | |
| Example 1 | 0.04 | 19500 | 20 | 0.002 | A | A | +1.3 | +1.2 |
| Example 2 | 0.05 | 19600 | 21 | 0.002 | A | A | +1.2 | +1.1 |
| Example 3 | 0.04 | 19700 | 40 | 0.002 | A | A | +1.3 | +1.2 |
| Comp. Example 1 | 0.04 | 7800 | 21 | 0.002 | C | C | −0.1 | −0.3 |
| Comp. Example 2 | 0.12 | 23200 | 22 | 0.002 | A | A | −0.1 | −0.2 |
| Comp. Example 3 | 0.04 | 19400 | 6 | 0.002 | A | C | +0.7 | −0.2 |
| Comp. Example 4 | 0.09 | 11000 | 170 | 0.002 | A | A | +0.1 | −0.3 |
| Comp. Example 5 | 0.04 | 19700 | 21 | — | A | B-C | +0.4 | +0.1 |

What is claimed is:

1. A magnetic recording medium comprising:
    a stretched polyethylene-2,6-naphthalate multilayered film having a high-roughness surface of a center-line average roughness of 0.001 to 0.010 μm and a low-roughness surface having a center-line average roughness which is less than that of the high-roughness surface and less than 0.004 μm, and wherein the low-roughness surface is on the side of the medium opposite from the high-roughness surface;
    a coating layer (A) comprising a polymeric binder and lubricant particles and having characteristics represented by the formulae $$0.01 \leq Ha \leq 0.08 \quad (1)$$

$$10,000 \leq Na \leq 60,000 \quad (2)$$

$$10 \leq HD \leq 150 \quad (3)$$

wherein Ha represents a three-dimensional average protuberance height measured in μm in the surface of the coating layer (A); Na represents the number of the protuberances/mm² in the surface of the coating layer (A); HD represents a surface hardness in units of μm⁻² of the coating layer (A) which is obtained by calculating from Vickers hardness measured by using a dynamic ultra-micro-hardness tester; and wherein coating layer (A) is formed on the high-roughness surface of said multilayered film;
    a coating layer (B) comprising a polymeric compound and having characteristics represented by the formula (4), $$0.001 \leq Hb \leq 0.008 \quad (4)$$

wherein Hb represents a three-dimensional average protuberance height measured in μm in the surface of the coating layer (B); and wherein coating layer (B) is formed on the low-roughness surface of said multilayered film;
    and wherein a ferromagnetic metal thin film is formed on said coating layer (B).

2. A magnetic recording medium according to claim 1, wherein the film having a high-roughness surface is made of polyethylene-2,6-naphthalate containing 0.01 to 5% by weight of particles having an average size of 0.01 to 0.3 μm.

3. A magnetic recording medium according to claim 1, wherein the film having a high-roughness surface is made of polyethylene-2,6-naphthalate containing other thermoplastic resin blended and dispersed therein.

4. A magnetic recording medium according to claim 1, wherein the film having a high-roughness surface is a polyethylene-2,6-naphthalate film which has been subjected to corona discharge or ultraviolet irradiation.

5. A magnetic recording medium according to claim 1, wherein the Young's modulus of the stretched polyethylene-2,6-naphthalate multilayered film is 650 kg/mm² in both machine and transverse directions.

6. A magnetic recording medium according to claim 1, wherein polyethylene-2,6-naphthalate of both film having a high-roughness surface and film having a low-roughness surface has a crystallinity of 28 to 38%.

7. A magnetic recording medium according to claim 1, wherein the ratio of thickness of the film having a high-roughness surface to that of the film having low-roughness surface is 1:5 to 10:1.

8. A magnetic recording medium according to claim 1, wherein the lubricant is at least one substance selected from the group consisting of silicon oxide, aluminum oxide, kaolin, molybdenum oxide, titanium oxide and calcium carbonate.

9. A magnetic recording medium according to claim 1, wherein the lubricant is at least one substance selected from the group consisting of fluorine-containing resin, polyethylene, polypropylene, polystyrene, polymethyl methacrylate and crosslinked polymers.

10. A magnetic recording medium according to claim 1, wherein the polymeric binder is composed of one or more compounds selected from the group consisting of polyesters, urethane resins, acrylic resins, olefin resins, cellulose resins, phenol resins, epoxy resins, vinyl acetate resins and rubber resins.

11. A magnetic recording medium according to claim 1, wherein a priming layer is disposed between the stretched polyethylene-2,6-naphthalate multilayered film and the coating layer (A).

12. A magnetic recording medium according to claim 1, wherein the coating layer (B) is composed of a polymeric compound having a lower glass transition temperature than the polyethylene-2,6-naphthalate.

13. A magnetic recording medium according to claim 1, wherein the thickness of the stretched polyethylene-2,6-naphthalate multilayered film is 3 to 20 μm, the thickness of the coating layer (A) is 0.02 to 2 μm, the thickness of the coating layer (B) is 0.01 to 1 μm and the thickness of the thin ferromagnetic metal film is 0.02 to 1 μm.

* * * * *